(12) United States Patent
Coslovsky et al.

(10) Patent No.: US 12,533,215 B2
(45) Date of Patent: Jan. 27, 2026

(54) METHODS AND APPARATUSES FOR DETECTING INTERPROXIMAL SPACES

(71) Applicant: Align Technology, Inc., San Jose, CA (US)

(72) Inventors: Jonathan Coslovsky, Rehovot (IL); Avraham Zulti, Modiin (IL); Ofer Saphier, Rehovot (IL)

(73) Assignee: Align Technology, Inc., San Jose, CA (US)

(*) Notice: Subject to any disclaimer, the term of this patent is extended or adjusted under 35 U.S.C. 154(b) by 272 days.

(21) Appl. No.: 18/311,215

(22) Filed: May 2, 2023

(65) Prior Publication Data

US 2023/0346514 A1   Nov. 2, 2023

Related U.S. Application Data

(60) Provisional application No. 63/337,590, filed on May 2, 2022.

(51) Int. Cl.
*A61C 7/00* (2006.01)
*A61B 1/24* (2006.01)

(52) U.S. Cl.
CPC ............ *A61C 7/002* (2013.01); *A61B 1/24* (2013.01)

(58) Field of Classification Search
None
See application file for complete search history.

(56) References Cited

U.S. PATENT DOCUMENTS

| | | | |
|---|---|---|---|
| 6,099,314 A | 8/2000 | Kopelman et al. |
| 6,334,772 B1 | 1/2002 | Taub et al. |
| 6,334,853 B1 | 1/2002 | Kopelman et al. |
| 6,463,344 B1 | 10/2002 | Pavloskaia et al. |
| 6,542,249 B1 | 4/2003 | Kofman et al. |
| 6,633,789 B1 | 10/2003 | Nikolskiy et al. |
| 6,664,986 B1 | 12/2003 | Kopelman et al. |
| 6,697,164 B1 | 2/2004 | Babayoff et al. |
| 6,845,175 B2 | 1/2005 | Kopelman et al. |
| 6,979,196 B2 | 12/2005 | Nikolskiy et al. |
| 7,030,383 B2 | 4/2006 | Babayoff et al. |
| 7,202,466 B2 | 4/2007 | Babayoff et al. |
| 7,255,558 B2 | 8/2007 | Babayoff et al. |
| 7,286,954 B2 | 10/2007 | Kopelman et al. |
| 7,319,529 B2 | 1/2008 | Babayoff |
| 7,373,286 B2 | 5/2008 | Nikolskiy et al. |
| 7,507,088 B2 | 3/2009 | Taub et al. |
| 7,545,372 B2 | 6/2009 | Kopelman et al. |
| 7,698,068 B2 | 4/2010 | Babayoff |

(Continued)

FOREIGN PATENT DOCUMENTS

| | | | | |
|---|---|---|---|---|
| EP | 2312529 A2 | 4/2011 | | |
| EP | 4095808 A1 * | 11/2022 | ........... | G06T 15/005 |

(Continued)

*Primary Examiner* — Fan Zhang
(74) *Attorney, Agent, or Firm* — Shay Glenn LLP

(57) ABSTRACT

An apparatus (system, device, method, and the like) is disclosed for refining a three-dimensional (3D) model, particularly 3D models of a subject's dentition. An initial 3D model is received or generated along with a plurality of two-dimensional (2D) images corresponding to the 3D model. The 3D model is refined using edge boundaries of a space around or between two or more objects of the 3D model identified from the 2D images.

18 Claims, 9 Drawing Sheets

(56) References Cited

U.S. PATENT DOCUMENTS

| | | |
|---|---|---|
| 7,916,911 B2 | 3/2011 | Kaza et al. |
| 8,108,189 B2 | 1/2012 | Chelnokov et al. |
| 8,244,028 B2 | 8/2012 | Kuo et al. |
| 8,587,582 B2 | 11/2013 | Matov et al. |
| 8,948,482 B2 | 2/2015 | Levin |
| D742,518 S | 11/2015 | Barak et al. |
| 9,192,305 B2 | 11/2015 | Levin |
| 9,261,356 B2 | 2/2016 | Lampert et al. |
| 9,261,358 B2 | 2/2016 | Atiya et al. |
| 9,299,192 B2 | 3/2016 | Kopelman |
| D760,901 S | 7/2016 | Barak et al. |
| 9,393,087 B2 | 7/2016 | Moalem |
| 9,408,679 B2 | 8/2016 | Kopelman |
| 9,431,887 B2 | 8/2016 | Boltanski |
| 9,439,568 B2 | 9/2016 | Atiya et al. |
| 9,451,873 B1 | 9/2016 | Kopelman et al. |
| D768,861 S | 10/2016 | Barak et al. |
| D771,817 S | 11/2016 | Barak et al. |
| 9,491,863 B2 | 11/2016 | Boltanski |
| D774,193 S | 12/2016 | Makmel et al. |
| 9,510,757 B2 | 12/2016 | Kopelman et al. |
| 9,660,418 B2 | 5/2017 | Atiya et al. |
| 9,668,829 B2 | 6/2017 | Kopelman |
| 9,675,430 B2 | 6/2017 | Verker et al. |
| 9,693,839 B2 | 7/2017 | Atiya et al. |
| 9,717,402 B2 | 8/2017 | Lampert et al. |
| 9,724,177 B2 | 8/2017 | Levin |
| 9,844,426 B2 | 12/2017 | Atiya et al. |
| 10,076,389 B2 | 9/2018 | Wu et al. |
| 10,098,714 B2 | 10/2018 | Kuo |
| 10,108,269 B2 | 10/2018 | Sabina et al. |
| 10,111,581 B2 | 10/2018 | Makmel |
| 10,111,714 B2 | 10/2018 | Kopelman et al. |
| 10,123,706 B2 | 11/2018 | Elbaz et al. |
| 10,136,972 B2 | 11/2018 | Sabina et al. |
| 10,380,212 B2 | 8/2019 | Elbaz et al. |
| 10,390,913 B2 | 8/2019 | Sabina et al. |
| 10,453,269 B2 | 10/2019 | Furst |
| 10,456,043 B2 | 10/2019 | Atiya et al. |
| 10,499,793 B2 | 12/2019 | Ozerov et al. |
| 10,504,386 B2 | 12/2019 | Levin et al. |
| 10,507,087 B2 | 12/2019 | Elbaz et al. |
| 10,517,482 B2 | 12/2019 | Sato et al. |
| 10,695,150 B2 | 6/2020 | Kopelman et al. |
| 10,708,574 B2 | 7/2020 | Furst et al. |
| 10,772,506 B2 | 9/2020 | Atiya et al. |
| 10,813,727 B2 | 10/2020 | Sabina et al. |
| 10,888,399 B2 | 1/2021 | Kopelman et al. |
| 10,952,816 B2 | 3/2021 | Kopelman |
| 10,980,613 B2 | 4/2021 | Shanjani et al. |
| 11,013,581 B2 | 5/2021 | Sabina et al. |
| D925,739 S | 7/2021 | Shalev et al. |
| 11,096,765 B2 | 8/2021 | Atiya et al. |
| 11,238,586 B2 | 2/2022 | Minchenkov et al. |
| 11,278,377 B1 | 3/2022 | Raslambekov |
| 11,367,192 B2 | 6/2022 | Kopelman et al. |
| 11,455,727 B2 | 9/2022 | Minchenkov et al. |
| 11,478,132 B2 | 10/2022 | Kopelman et al. |
| 11,563,929 B2 | 1/2023 | Saphier et al. |
| 11,633,268 B2 | 4/2023 | Moalem et al. |
| 2019/0388193 A1 | 12/2019 | Saphier et al. |
| 2020/0281702 A1 | 9/2020 | Kopelman et al. |
| 2021/0030503 A1 | 2/2021 | Shalev et al. |
| 2021/0059796 A1 | 3/2021 | Weiss et al. |
| 2021/0068773 A1 | 3/2021 | Moshe et al. |
| 2021/0073998 A1 | 3/2021 | Brown et al. |
| 2021/0074061 A1* | 3/2021 | Brown ............... G06T 17/205 |
| 2021/0121049 A1 | 4/2021 | Rudnitsky et al. |
| 2021/0128281 A1 | 5/2021 | Peleg |
| 2021/0137653 A1 | 5/2021 | Saphier et al. |
| 2021/0196152 A1 | 7/2021 | Saphier et al. |
| 2022/0117708 A1* | 4/2022 | Cofar ............... G16H 50/50 |
| 2023/0048898 A1* | 2/2023 | Cofar ............... G16H 30/20 |

FOREIGN PATENT DOCUMENTS

| | | |
|---|---|---|
| FR | 3111268 A1 | 12/2021 |
| WO | WO-2020126058 A1 | 6/2020 |

* cited by examiner

METHODS AND APPARATUSES FOR DETECTING INTERPROXIMAL SPACES

CLAIM OF PRIORITY

This patent application claims priority to U.S. provisional patent application No. 63/337,590, titled "INTERPROXIMAL SPACE DETECTION FOR THREE-DIMENSIONAL MODELS," filed on May 2, 2022 and herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

This disclosure relates generally to methods and apparatuses for orthodontic treatment planning, and more specifically to method and apparatuses for accurately modeling a patient's dentition from intraoral scan date, including difficult to resolve interproximal regions.

BACKGROUND

Orthodontic and dental treatments using a series of patient-removable appliances (e.g., "aligners") are very useful for treating patients. Treatment planning is typically performed in conjunction with the dental professional (e.g., dentist, orthodontist, dental technician, etc.), by generating a model of the patient's teeth in a final configuration and then breaking the treatment plan into a number of intermediate stages (steps) corresponding to individual appliances that are worn sequentially. This process may be interactive, adjusting the staging and in some cases the final target position, based on constraints on the movement of the teeth and the dental professional's preferences. Once the final treatment plan is finalized, the series of aligners may be manufactured corresponding to the treatment planning.

A patient's treatment plan may begin with a three-dimension (3D) model of the patient's teeth. Conventionally, the 3D model may be determined with a non-contact, optical scanner. However, errors in the 3D model, in some cases caused by incomplete or erroneous scan data, may cause errors in the associated patient's treatment plan.

Thus, there is a need for new and useful apparatus (devices, methods, or the like) for obtaining high quality 3D models.

SUMMARY OF THE DISCLOSURE

Described herein are methods and apparatuses (e.g., systems and devices) that can refine an initial or preliminary 3D model of a patient's dentition to include accurate representation of difficult to image regions, including interproximal regions. These methods and apparatuses may be part of an orthodontic treatment method and/or apparatus. In some examples, projection data associated with camera positions that have been used to capture the optical scans may be used to determine the presence of regions within the dentition that may be difficult or impossible to accurately image using an intraoral scanner, including in particular interproximal spaces. In some examples these methods and apparatuses may be configured to confirm that an interproximal space is present or likely to be present and may then refine the boundaries of the teeth in these regions, in order to refine the digital 3D model of the patient's dentition.

As used herein a digital model of the patient's dentition may be referred to herein equivalently as a digital 3D model of the patient's dentition, or simply as a 3D model. In general, the initial or preliminary 3D model of the patient's dentition may be generated by or received from conventional optical scanners, including intraoral scanners. Any appropriate intraoral scanner may be used. Further, any appropriate digital representation of the subject's dentition (all or a portion of the dentition) may be used. For example, the digital 3D model of the patient's dentition may be configured as a "point cloud" of data points. A point cloud may refer to a plurality of data points that can define a surface of the 3D model.

In some examples, a 3D model of the patient's dentition may undergo processing to identify surfaces of the 3D model (e.g., segmentation) and/or may be processed to find or determine interproximal spaces or other regions of the dentition that are associated with or adjacent, and in some cases overlapping surfaces. These regions are referred to generically herein as "interproximal regions' and may be difficult to visualize with an intraoral scanner because imaging from any external angle (e.g., buccal, lingual, and/or occlusal) may be at least partially obscured or shadowed, making it difficult to resolve these regions with millimeter or sub-millimeter accuracy. Current methods of defining the tooth surfaces, including inter-proximal spaces, which may be based just on 3D capture (e.g., using an intraoral scanner) are typically limited to a resolution of more than 300 μm and are unreliable to accurately mark correctly each inter-proximal spaces.

In general, the methods and apparatuses described herein may be used during scanning of the patient's dentition (e.g., in real time or semi-real time) or after scanning of the dentition, in order to improve the quality (e.g., resolution) of a 3D digital model of the patient's dentition. These methods may also or alternatively be used to assist in identifying one or more structures of the patient's dentition, e.g., for segmenting the patient's dentition, including accurately distinguishing between teeth, teeth and gingiva, etc.

In any of these methods the 3D digital model of the patient's dentition may be reviewed or analyzed to determine the location of interproximal region(s) ("IP spaces"). Any appropriate technic (e.g., manual, automatic or semi-automatic) may be used to identify the presence of interproximal spaces. For example, a machine agent comprising a trained network (e.g., neural networks) may be used. Any of the methods and apparatuses described herein may include the use of a trained neural network to identify interproximal regions. After the interproximal spaces are located, the methods and apparatuses described herein can remove point cloud data associated with the interproximal spaces to refine the 3D model.

For example, described herein are methods and apparatuses for refining one or more 3D models. For example, the methods and apparatuses may include receiving or generating a three-dimensional (3D) model of a subject's dentition, where the 3D model is based on a scan of the subject's dentition, refining the 3D model to generate a refined 3D model using edge boundaries of a space around or between one or more teeth of the 3D model identified from a plurality of two-dimensional (2D) images of the subject's dentition corresponding to the 3D model, and outputting information associated with the refined 3D model. The 2D images may be received with or separately received from the 3D model data. For example, the 2D images may be taken at the same time as the 3D imaging data (e.g., structured light, confocal, etc.) data is collected. The 2D images may be visible light images, florescent images, white-light images, near-IR images, etc.

In some examples, refining the 3D model may include identifying the interproximal region and identifying edge boundaries around the interproximal space from the 2D images of the subject's dentition, and generating potential new surface points for the 3D model from the identified edge boundaries for the plurality of 2D images. In some examples, refining the 3D model may further include removing at least a subset of the new surface points from the 3D model that fall within one or more of the edge boundaries around the space from the 2D images. The remaining points (e.g., in the point cloud) may be smoothed or otherwise used to generate the new outer tooth surface(s). In some examples, identifying the edge boundaries of the space around or between the one or more teeth may include identifying, for each of at least a subset of the plurality of the 2D images, a boundary of the space around or between one or more teeth from each of the 2D images of the subject's dentition in the subset using machine learning. In some examples, refining the 3D model may include smoothing an edge of each identified boundary.

In some examples, generating potential new surface points for the 3D model from the identified edge boundaries may include using a position of a camera corresponding to each of the 2D images of the plurality of 2D images. Generating potential new surface points may further include mapping the identified edge boundaries to the 3D model and determining rays formed between a plurality of points on each of the edge boundaries and the position of the camera during capture of the 2D image of the subject's dentition relative to surface of the subject's dentition and generating the new points for the 3D model between points on a surface of the 3D model where each ray enters and exits the surface of the 3D model. In some examples, each point may have an associated normal vector at a direction that is perpendicular to the ray and to a tangent to the identified space.

In some examples, the method for refining one or more 3D models may include using edge boundaries of a space around or between one or more teeth of the 3D model, where the space comprises an interproximal space between two teeth of the subject's dentition. The modified or improved 3D model may be used for further treatment planning and may provide more accurate positions and other information about the patient's teeth, which may be critically helpful in designing and/or tracking a tooth treatment. Alternatively or additionally, the methods and apparatuses described herein may be configured to output information about the interproximal tooth region(s). In some examples, the method may include outputting information that includes an indication of whether the two teeth are touching. In some examples, the method may include outputting information that includes displaying the information to a user. The displayed information may include quantification information (e.g., how large the interproximal region(s) is/area, including dimensional information, area, volume, etc.).

In some examples, the method for refining one or more 3D models may include outputting information to a segmentation module, where the segmentation module (which may include a segmentation algorithm) separates the refined 3D model into individual teeth.

Any appropriate 2D images may be used as part of this process. For example, the plurality of 2D images of the subject's dentition may include white light images, near infrared images, and/or florescence images. The 2D images may be associated with the 3D model, including in particular the position and/or orientation of the camera (e.g., intraoral scanner) relative to the dentition may be associated with each 2D image. The position information may be included as part of the dataset with the 3D data. For example, the 3D data scan may collect images of the dentition interleaved with collection of 2D data, so that the camera(s) for each may be in approximately the same location or may be determined by extrapolation from the 3D data. The 2D image may come directly from a structured light image. In a structured light image, there is usually enough stray light and percolation to clearly make out the tooth boundary. This may give many more view directions.

In any of these examples the method and apparatus may include receiving or generating a three-dimensional (3D) model of a subject's dentition, wherein the 3D model is based on a scan of the subject's dentition. The step of receiving or generating a three-dimensional (3D) model of a subject's dentition may include receiving and/or generating the 2D images. The 3D model is based on a scan of the subject's dentition. Any of these methods may further include refining the 3D model to generate a refined 3D model using edge boundaries of a space around or between one or more teeth of the 3D model identified from the plurality of 2D images of the subject's dentition, wherein refining the 3D model comprises identifying edge boundaries around the space from the 2D images of the subject's dentition, and generating potential new surface points for the 3D model from the identified edge boundaries for the plurality of 2D images, and outputting information associated with the refined 3D model.

In some examples, a method may include receiving or generating a three-dimensional (3D) model of a subject's dentition, wherein the 3D model is based on a scan of the subject's dentition, receiving or generating a plurality of two-dimensional (2D) images of the subject's dentition corresponding to the 3D model taken as part of the same scan of the subject's dentition, refining the 3D model to generate a refined 3D model by: identifying an edge boundary around a space around or between one or more teeth from a 2D image of the subject's dentition using machine learning to identify the space and smoothing an edge of the identified space to form the edge boundary around the space, generating potential new surface points for the 3D model from the identified edge boundary using a position of a camera corresponding to the 2D image by mapping the identified edge boundary to the 3D model and determining rays formed between a plurality of points on the edge boundary and the position of the camera during capture of the 2D image of the subject's dentition relative to surface of the subject's dentition, and generating one or more new points for the 3D model between points on a surface of the 3D model where each ray enters and exits the surface of the 3D model, repeating the steps of identifying the edge boundary around the space from 2D images, and generating potential new surface points for the 3D model from the identified edge boundaries for a plurality of 2D images taken from different positions, and remove new surface points from the 3D model that fall within one or more of the edge boundaries around the space from the 2D images, and outputting information associated with the refined 3D model.

In some examples, a method may include capturing three-dimensional (3D) information of a surface of a subject's dentition, generating a 3D model of the surface of the subject's dentition from the 3D information, identifying edge information of the surface from the captured 2D image, wherein the edge information is tangent to the surface of the subject's dentition, refining the generated 3D model, to generate a refined 3D model, using the identified edge information of the surface from the captured 2D images, and outputting information associated with the refined 3D model.

In some examples, the surface of the subject's dentition may include an interproximal space between two teeth of the subject's dentition, and wherein the edge information comprises edges of the teeth in the interproximal space. Furthermore, the information outputted may include an indication of whether the two teeth are touching. In some examples, the information outputted may include a measurement of the interproximal space between the two teeth.

In some examples, outputting the information may include outputting to a user display. Outputting the information may additionally or alternatively include outputting to a segmentation algorithm, and where the segmentation algorithm separates the refined 3D model into individual teeth.

In some examples, identifying the edge information may include analyzing the captured 2D image using a trained neural network. In some examples, the 2D images of the subject's dentition may include white light images, near infrared images, and/or florescence images.

Optionally, in some examples, the methods described herein may include capturing three-dimensional (3D) information of a surface of a subject's dentition by projecting a structured light pattern on the surface and capturing the projected structured light pattern with one or more cameras and generating a 3D model of the surface of the subject's dentition from the 3D information using a correspondence algorithm or triangulation algorithm. The methods and apparatuses described herein are not limited to the use of structured light, but may be used with other imaging techniques, including confocal scanning or other 3D scanning techniques. In some examples, these methods may also include identifying at least some edge information of the surface from the two-dimensional (2D) images (which may be taken from the 3D scanning data) from the one or more cameras, e.g., from percolation and stray light. Percolation is one technique that may be used for or with illumination of the edges; other techniques that may be used include unfocused light, and leakage light from the DOE (generally, stray light may be used). For example, at least some edge information of the surface may be from captured two-dimensional (2D) images from the one or more cameras from percolation of the structured light pattern into a tooth, wherein the edge information is tangent to the surface of the subject's dentition. Any of these method may further include refining the generated 3D model to generate a refined 3D model, using the identified edge information of the surface from the individual captured 2D images, and outputting information associated with the refined 3D model.

Described herein are systems that may be used to refine one or more 3D models. In some examples, a system may include one or more processors, and a memory configured to store instructions that, when executed by the one or more processors, cause the system to: receive or generate a three-dimensional (3D) model of a subject's dentition, wherein the 3D model is based on a scan of the subject's dentition, refine the 3D model to generate a refined 3D model using edge boundaries of a space around or between one or more teeth of the 3D model identified from the plurality of 2D images of the subject's dentition, and output information associated with the refined 3D model. The plurality of 2D images may be received or generated with the 3D model; in general, the plurality of two-dimensional (2D) images of the subject's dentition correspond to the 3D model. The 3D model is not typically generated by plurality of 2D images but may include concurrently taken 2D images. Alternatively, 2D images may be taken separately from the 3D imaging.

In some examples, execution of the instructions to refine of the 3D model may cause the system to further identify edge boundaries around the space from the 2D images of the subject's dentition and generate potential new surface points for the 3D model from the identified edge boundaries for the plurality of 2D images. Furthermore, execution of the instructions may cause the system to remove new surface points from the 3D model that fall within one or more of the edge boundaries around the space from the 2D images. In still other examples, execution of the instructions to identify the edge boundaries of the space around or between the one or more teeth may cause the system to identify, for each of at least a subset of the plurality of the 2D images, a boundary of the space around or between one or more teeth from each of the 2D images of the subject's dentition in the subset using machine learning. In some examples, execution of the instructions may cause the system to smooth an edge of each identified boundary.

In some examples, execution of the instructions to generate potential new surface points for the 3D model from the identified edge boundaries may cause the system to use a position of a camera corresponding to each of the 2D images of the plurality of 2D images. Furthermore, in some examples, execution of the instructions may cause the system to map the identified edge boundaries to the 3D model and determine rays formed between a plurality of points on each of the edge boundaries and the position of the camera during capture of the 2D image of the subject's dentition relative to surface of the subject's dentition and generate the new points for the 3D model between points on a surface of the 3D model where each ray enters and exits the surface of the 3D model. Each point may have an associated normal vector at a direction that is perpendicular to the ray and to a tangent to the identified space.

In some examples, execution of the instructions may cause the system to generate a refined 3D model using edge boundaries of a space, where the space comprises an interproximal space between two teeth of the subject's dentition. In some examples, the output information may include an indication of whether the two teeth are touching. In some examples, the output information comprises a measurement of the space between the two teeth.

In some examples, execution of the instructions to output the information associated with the refined 3D model may cause the system to display the information to a user. Additionally or alternatively, execution of the instructions to output the information associated with the refined 3D model may cause the system to output to a segmentation algorithm, where the segmentation algorithm is configured to separate the refined 3D model into individual teeth.

In some examples, the plurality of 2D images may be white light images, near infrared images, and/or florescence images. In any of these examples, the structured light image(s) themselves can be used with the methods and apparatuses described herein, instead of the 2D images. Thus, although the structure light images may be used to find the structured light pattern positions (and generate 3D surface data), they may also be used as described herein instead of or in addition to 2D images.

In some examples, a system may include one or more processors and a memory configured to store instructions that, when executed by the one or more processors, cause the system to receive or generate a three-dimensional (3D) model of a subject's dentition, where the 3D model is based on a scan of the subject's dentition, receive or generate a plurality of two-dimensional (2D) images of the subject's dentition corresponding to the 3D model taken as part of the same scan of the subject's dentition, refine the 3D model to generate a refined 3D model using edge boundaries of a space around or between one or more teeth of the 3D model identified from the plurality of 2D images of the subject's dentition, wherein refining the 3D model comprises identifying edge boundaries around the space from the 2D images of the subject's dentition, and generating potential new surface points for the 3D model from the identified edge boundaries for the plurality of 2D images and output information associated with the refined 3D model.

In some other examples, a system may include one or more processors and a memory configured to store instructions that, when executed by the one or more processors, cause the system to: receive or generate a three-dimensional (3D) model of a subject's dentition, where the 3D model is based on a scan of the subject's dentition, receive or generate a plurality of two-dimensional (2D) images of the subject's dentition corresponding to the 3D model taken as part of the same scan of the subject's dentition, refine the 3D model to generate a refined 3D model, wherein the refinement causes the system to: identify an edge boundary around a space around or between one or more teeth from a 2D image of the subject's dentition using machine learning to identify the space and smoothing an edge of the identified space to form the edge boundary around the space, generate potential new surface points for the 3D model from the identified edge boundary using a position of a camera corresponding to the 2D image by mapping the identified edge boundary to the 3D model and determining rays formed between a plurality of points on the edge boundary and the position of the camera during capture of the 2D image of the subject's dentition relative to surface of the subject's dentition, and generating one or more new points for the 3D model between points on a surface of the 3D model where each ray enters and exits the surface of the 3D model, repeat the steps of identifying the edge boundary around the space from 2D images, and generating potential new surface points for the 3D model from the identified edge boundaries for a plurality of 2D images taken from different positions, and remove new surface points from the 3D model that fall within one or more of the edge boundaries around the space from the 2D images and output information associated with the refined 3D model.

In some examples, a system may include one or more processors and a memory configured to store instructions that, when executed by the one or more processors, cause the system to: receive or generate a three-dimensional (3D) model of a subject's dentition, where the 3D model is based on a scan of the subject's dentition, receive or generate a plurality of two-dimensional (2D) images of the subject's dentition corresponding to the 3D model taken as part of the same scan of the subject's dentition, refine the 3D model to generate a refined 3D model, wherein the refinement causes the system to: identify an edge boundary around a space around or between one or more teeth from a 2D image of the subject's dentition using machine learning to identify the space and smoothing an edge of the identified space to form the edge boundary around the space, generate potential new surface points for the 3D model from the identified edge boundary using a position of a camera corresponding to the 2D image by mapping the identified edge boundary to the 3D model and determining rays formed between a plurality of points on the edge boundary and the position of the camera during capture of the 2D image of the subject's dentition relative to surface of the subject's dentition, and generating one or more new points for the 3D model between points on a surface of the 3D model where each ray enters and exits the surface of the 3D model, repeat the steps of identifying the edge boundary around the space from 2D images, and generating potential new surface points for the 3D model from the identified edge boundaries for a plurality of 2D images taken from different positions, and remove new surface points from the 3D model that fall within one or more of the edge boundaries around the space from the 2D images, and output information associated with the refined 3D model.

In some examples, a system may include one or more processors and a memory configured to store instructions that, when executed by the one or more processors, cause the system to capture three-dimensional (3D) information of a surface of a subject's dentition, generate a 3D model of the surface of the subject's dentition from the 3D information, identify edge information of the surface from the captured 2D image, where the edge information is tangent to the surface of the subject's dentition, refine the generated 3D model, to generate a refined 3D model, using the identified edge information of the surface from the captured 2D images, and output information associated with the refined 3D model.

In some examples, for some systems the surface of the subject's dentition may include an interproximal space between two teeth of the subject's dentition, and where the edge information comprises edges of the teeth in the interproximal space. Furthermore, the output information may include an indication of whether the two teeth are touching. Additionally or alternatively, the output information may include a measurement of the interproximal space between the two teeth. In some examples, the output information may be output to a user display.

In some examples, the output information may be output to a segmentation algorithm, and where the segmentation algorithm separates the refined 3D model into individual teeth. In some examples, execution of the instructions to identify the edge information may cause the system to analyze the captured 2D image using a trained neural network. The 2D image may be a white light image, a near infrared image, and/or a fluorescence image.

In some examples a system may include one or more processors and a memory configured to store instructions that, when executed by the one or more processors, cause the system to: capture three-dimensional (3D) information of a surface of a subject's dentition by projecting a structured light pattern on the surface and capturing the projected structured light pattern with one or more cameras, generate a 3D model of the surface of the subject's dentition from the 3D information using a correspondence algorithm or triangulation algorithm, identify at least some edge information of the surface from captured two-dimensional (2D) images from the one or more cameras from percolation of the structured light pattern into a tooth, where the edge information is tangent to the surface of the subject's dentition, refine the generated 3D model, to generate a refined 3D model, using the identified edge information of the surface from the individual captured 2D images, and output information associated with the refined 3D model.

Any of the methods described herein may be configured as non-transitory computer-readable storage mediums that are configured to perform any of these methods. For example, a non-transitory computer-readable storage medium may include instructions that, when executed by one or more processors of a device, cause the device to perform operations comprising: receiving or generating a three-dimensional (3D) model of a subject's dentition, where the 3D model is based on a scan of the subject's dentition, receiving or generating a plurality of two-dimensional (2D) images of the subject's dentition corresponding to the 3D model, refining the 3D model to generate a refined 3D model using edge boundaries of a space around or between one or more teeth of the 3D model identified from the plurality of 2D images of the subject's dentition, and outputting information associated with the refined 3D model.

In some examples, execution of the instructions to refine of the 3D model may cause the device to perform operations comprising identifying edge boundaries around the space from the 2D images of the subject's dentition and generating potential new surface points for the 3D model from the identified edge boundaries for the plurality of 2D images. In some examples, execution of the instructions may cause the device to perform operations comprising removing new surface points from the 3D model that fall within one or more of the edge boundaries around the space from the 2D images. In some examples, execution of the instructions may cause the device to perform operations comprising identifying the edge boundaries of the space around or between the one or more teeth may cause the device to identify, for each of at least a subset of the plurality of the 2D images, a boundary of the space around or between one or more teeth from each of the 2D images of the subject's dentition in the subset using machine learning. Further execution of the instructions may cause the device to perform operations comprising smoothing an edge of each identified boundary.

In some examples, execution of the instructions to generate potential new surface points for the 3D model from the identified edge boundaries may cause the device to perform operations using a position of a camera corresponding to each of the 2D images of the plurality of 2D images.

In some examples, execution of the instructions may cause the device to perform operations comprising mapping the identified edge boundaries to the 3D model and determining rays formed between a plurality of points on each of the edge boundaries and the position of the camera during capture of the 2D image of the subject's dentition relative to surface of the subject's dentition, and generating the new points for the 3D model between points on a surface of the 3D model where each ray enters and exits the surface of the 3D model. In some examples, each point may have an associated normal vector at a direction that is perpendicular to the ray and to a tangent to the identified space.

In some examples, the identified space may include an interproximal space between two teeth of the subject's dentition. In some examples, the output information may include an indication of whether the two teeth are touching. In some examples, the output information may include a measurement of the space between the two teeth.

In some examples, execution of the instructions to output the information associated with the refined 3D model may cause the device to perform operations comprising displaying the information to a user. Furthermore, execution of the instructions to output the information associated with the refined 3D model may cause the device to perform operations comprising outputting to a segmentation algorithm, and wherein the segmentation algorithm is configured to separate the refined 3D model into individual teeth. In some examples, the plurality of 2D images may be white light images, near infrared images, and/or fluorescence images.

In some examples, a non-transitory computer-readable storage medium comprising instructions that, when executed by one or more processors of a device, may cause the device to perform operations comprising: receiving or generating a three-dimensional (3D) model of a subject's dentition, where the 3D model is based on a scan of the subject's dentition, receiving or generating a plurality of two-dimensional (2D) images of the subject's dentition corresponding to the 3D model taken as part of the same scan of the subject's dentition, refining the 3D model to generate a refined 3D model using edge boundaries of a space around or between one or more teeth of the 3D model identified from the plurality of 2D images of the subject's dentition, where refining the 3D model comprises identifying edge boundaries around the space from the 2D images of the subject's dentition, and generating potential new surface points for the 3D model from the identified edge boundaries for the plurality of 2D images, and outputting information associated with the refined 3D model.

In some examples, a non-transitory computer-readable storage medium comprising instructions that, when executed by one or more processors of a device, cause the device to perform operations comprising: receiving or generating a three-dimensional (3D) model of a subject's dentition, where the 3D model is based on a scan of the subject's dentition, receiving or generating a plurality of two-dimensional (2D) images of the subject's dentition corresponding to the 3D model taken as part of the same scan of the subject's dentition, refining the 3D model to generate a refined 3D model, wherein the refinement causes the system to: identifying an edge boundary around a space around or between one or more teeth from a 2D image of the subject's dentition using machine learning to identify the space and smoothing an edge of the identified space to form the edge boundary around the space, generating potential new surface points for the 3D model from the identified edge boundary using a position of a camera corresponding to the 2D image by mapping the identified edge boundary to the 3D model and determining rays formed between a plurality of points on the edge boundary and the position of the camera during capture of the 2D image of the subject's dentition relative to surface of the subject's dentition, and generate one or more new points for the 3D model between points on a surface of the 3D model where each ray enters and exits the surface of the 3D model, repeating the steps of identifying the edge boundary around the space from 2D images, and generating potential new surface points for the 3D model from the identified edge boundaries for a plurality of 2D images taken from different positions, and removing new surface points from the 3D model that fall within one or more of the edge boundaries around the space from the 2D images and outputting information associated with the refined 3D model.

In some examples, a non-transitory computer-readable storage medium comprising instructions that, when executed by one or more processors of a device, may cause the device to perform operations comprising: capturing three-dimensional (3D) information of a surface of a subject's dentition, generating a 3D model of the surface of the subject's dentition from the 3D information, capturing a two-dimensional (2D) image of the surface of the subject's dentition, identify edge information of the surface from the captured 2D image, where the edge information is tangent to the surface of the subject's dentition, refining the generated 3D model, to generate a refined 3D model, using the identified edge information of the surface from the captured 2D images, and outputting information associated with the refined 3D model.

In some examples, the surface of the subject's dentition may include an interproximal space between two teeth of the subject's dentition, and the edge information may include edges of the teeth in the interproximal space. Furthermore, the output information may include an indication of whether the two teeth are touching. In some examples, the output information may include a measurement of the interproximal space between the two teeth. In some examples, the output information may be output to a user display.

In some examples, the output information may be output to a segmentation algorithm, and the segmentation algorithm may separate the refined 3D model into individual teeth.

In some examples, execution of the instructions to identify the edge information may cause the device to perform operations comprising analyzing the captured 2D image using a trained neural network. The 2D image may be a white light image, a near infrared image, and/or a fluorescence image.

In some examples, a non-transitory computer-readable storage medium comprising instructions that, when executed by one or more processors of a device, cause the device to perform operations comprising capturing three-dimensional (3D) information of a surface of a subject's dentition by projecting a structured light pattern on the surface and capturing the projected structured light pattern with one or more cameras, generating a 3D model of the surface of the subject's dentition from the 3D information using a correspondence algorithm or triangulation algorithm, identifying at least some edge information of the surface from captured two-dimensional (2D) images from the one or more cameras from percolation of the structured light pattern into a tooth, where the edge information is tangent to the surface of the subject's dentition, refining the generated 3D model, to generate a refined 3D model, using the identified edge information of the surface from the individual captured 2D images, outputting information associated with the refined 3D model.

For example, described herein are methods comprising: receiving or generating a three-dimensional (3D) model of a subject's dentition, wherein the 3D model is based on a scan of the subject's dentition; generating a refined 3D model from the 3D model of the subject's dentition using one or more edge boundaries of a space around or between one or more teeth of the 3D model identified from a plurality of 2D images of the subject's dentition, wherein the plurality of two-dimensional (2D) images of the subject's dentition correspond to the 3D model; and outputting the refined 3D model and/or information associated with the refined 3D model.

The 3D model or data for the 3D model and the 2D images may be received as part of the same data stream.

Generating the refined 3D model may include: identifying edge boundaries around the space from the 2D images of the subject's dentition; and generating potential new surface points for the 3D model from the identified edge boundaries for the plurality of 2D images.

Any of these methods may include removing new surface points from the 3D model that fall within one or more of the edge boundaries around the space from the 2D images. In some examples identifying the edge boundaries of the space around or between the one or more teeth comprises identifying, for each of at least a subset of the plurality of the 2D images, a boundary of the space around or between one or more teeth from each of the 2D images of the subject's dentition in the subset using a trained neural network.

Any of these methods may include smoothing an edge of each identified boundary.

Generating potential new surface points for the 3D model from the identified edge boundaries may include using a position of a camera corresponding to each of the 2D images of the plurality of 2D images.

As mentioned above, any of these methods may include mapping the identified edge boundaries to the 3D model and determining rays formed between a plurality of points on each of the edge boundaries and the position of the camera during capture of the 2D image of the subject's dentition relative to surface of the subject's dentition; and generating the new points for the 3D model between points on a surface of the 3D model where each ray enters and exits the surface of the 3D model. Each point may have an associated normal vector at a direction that is perpendicular to the ray and to a tangent to the identified space.

The space may comprise an interproximal space between two teeth of the subject's dentition. The information outputted may include an indication of whether the two teeth are touching. The information outputted may comprise a measurement of the space between the two teeth. In any of these examples outputting the information may include displaying the information to a user.

Outputting the information may include outputting to a segmentation algorithm, and wherein the segmentation algorithm separates the refined 3D model into individual teeth.

The plurality of 2D images may be white light images, near infrared images, and/or fluorescence images.

For example, a method as described herein may include: receiving or generating a three-dimensional (3D) model of a subject's dentition, wherein the 3D model is based on a scan of the subject's dentition; receiving or generating a plurality of two-dimensional (2D) images of the subject's dentition corresponding to the 3D model taken as part of the same scan of the subject's dentition; generating a refined 3D model from the 3D model of the subject's dentition using edge boundaries of a space around or between one or more teeth of the 3D model identified from the plurality of 2D images of the subject's dentition, wherein generating the refined 3D model comprises identifying edge boundaries around the space from the 2D images of the subject's dentition, and generating new surface points for the refined 3D model from the identified edge boundaries; and outputting the refined 3D model and/or information associated with the refined 3D model.

In some examples the method includes: receiving or generating a three-dimensional (3D) model of a subject's dentition, wherein the 3D model is based on a scan of the subject's dentition; receiving or generating a plurality of two-dimensional (2D) images of the subject's dentition corresponding to the 3D model taken as part of the same scan of the subject's dentition; generating a refined 3D model from the 3D model of the subject's dentition by: identifying an edge boundary around a space around or between one or more teeth from a 2D image of the subject's dentition using a trained neural network to identify the space and smoothing an edge of the identified space to form the edge boundary around the space, generating potential new surface points for the refined 3D model from the identified edge boundary using a position of a camera corresponding to the 2D image by mapping the identified edge boundary to the 3D model and projecting rays between a plurality of points on the edge boundary and the position of the camera during capture of the 2D image of the subject's dentition relative to surface of the subject's dentition, and generating one or more new points for the 3D model between points on a surface of the 3D model where each ray enters and exits the surface of the 3D model, repeating the steps of identifying the edge boundary around the space from 2D images, and generating potential new surface points for the refined 3D model from the identified edge boundaries for a plurality of 2D images taken from different positions, and remove new surface points from the refined 3D model that fall within one or more of the edge boundaries around the space from the 2D images; and outputting the refined 3D model and/or information associated with the refined 3D model.

All of the methods and apparatuses described herein, in any combination, are herein contemplated and can be used to achieve the benefits as described herein.

BRIEF DESCRIPTION OF THE DRAWINGS

A better understanding of the features and advantages of the methods and apparatuses described herein will be obtained by reference to the following detailed description that sets forth illustrative embodiments, and the accompanying drawings of which.

DETAILED DESCRIPTION

Conventional three-dimensional (3D) models of a patient's teeth may be generated based on one or more optical scans. For example, data from the optical scans may be processed and filtered to generate an initial 3D model. Unfortunately, the data from some optical scans may not be able to capture all the characteristics of the patient's teeth, particularly interproximal spaces between teeth. As a result, the associated 3D model may lack interproximal spaces.

In this disclosure, methods and apparatuses (e.g., systems, devices, etc.) are described that can refine an initial 3D model to include interproximal space data that may be missing or incomplete. In some examples, projection data associated with camera positions that have been used to capture the optical scans may be used to determine the presence of interproximal spaces. If an interproximal space is determined to be present, then the interproximal space data is removed to refine the 3D model.

Figure 1:
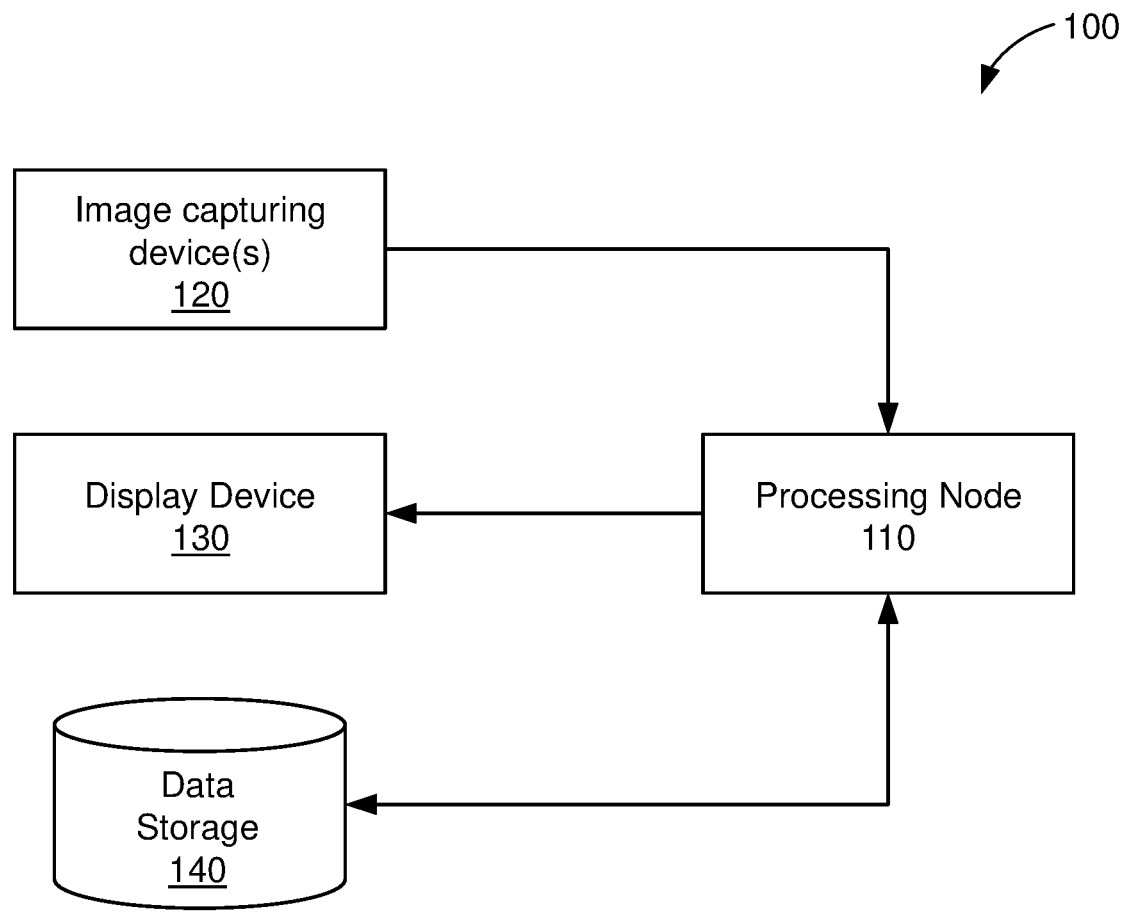
FIG. 1 shows a block diagram of an example three-dimensional (3D) model generation system.

FIG. 1 shows a block diagram of an example 3D model generation apparatus 100. Although described herein as an apparatus, the 3D model generation apparatus 100 may be realized with any feasible apparatus, system, or device. The 3D model generation apparatus 100 may include a processing node 110, an image capturing device 120, a display device 130, and a data storage device 140. As shown, the image capturing device 120, the display device 130, and the data storage device 140 may each be coupled to the processing node 110.

The image capturing device 120 may include one or more separate image capturing devices that capture optical images of a patient's teeth (sometimes referred to herein as a subject's dentition). In some examples, the image capturing device 120 may include a white light, near infrared light, ultraviolet light, and/or fluorescence light sources and sensors. In some other examples, the image capturing device 120 may include non-structured or structured light sources. In still other examples, the image capturing device 120 may include any number of feasible light sources and sensors.

Thus, the image capturing device 120 can capture multiple images of the patient's teeth. In some examples, the image capturing device(s) 120 can simultaneously capture images of the patient's teeth using multiple light sources and sensors.

The display device 130 may be any feasible image display device. In some examples, the display device 130 may be an integral part of the 3D model generation apparatus 100 and be integrated into a housing or case. In other examples, the display device 130 may be communicatively coupled to the 3D model generation apparatus 100 through, for example, wired or wireless connections. In some cases, the display device 130 may be a computer monitor, tablet device, mobile phone, or the like. The display device 130 may be used to display image data, such as image data collected by the image capturing device 120 and 3D model data that may be determined (computed) by the processing node 110.

The data storage device 140 may be any feasible data storage device including random access memory, solid state memory, disk based memory, non-volatile memory, and the like. The data storage device 140 may store image data, including image data captured through one or more image capturing devices 120. The data storage device 140 may also store 3D model data, including 3D model data determined and/or rendered by the processing node 110.

The data storage device 140 may also include a non-transitory computer-readable storage medium that may store instructions that may be executed by the processing node 110. For example, the processing node 110 may include one or more processors (not shown) that may execute instructions stored in the data storage device 140 to perform any number of operations including processing image data from the image capturing device 120 and generating a 3D model of the patient's teeth.

The methods described herein may be performed by an apparatus 100 such as that shown in FIG. 1 or may be performed using data (e.g., 3D and/or 2D data) provided by an apparatus such as that shown in FIG. 1. For example, the processing node 110 of the apparatus 100 may include software, firmware and/or hardware configured to perform the methods described herein, including identifying one or more interproximal regions, determining the boundary of the interproximal region(s) in 2D images corresponding to the 3D model from one or more preferably multiple different camera angles, and/or refining the surface of the 3D digital model using the identified boundaries and camera positions.

As mentioned above, a 3D model of a subject's dentition may not include accurate interproximal spaces. Interproximal spaces include gaps and/or regions of overlap between adjacent teeth that may affect a patient's treatment plan for providing dental treatment, including orthodontic treatment. Thus, if the interproximal spaces are incorrect or missing in a patient's 3D model, then an associated treatment plan may be incorrect.

Figure 2A:
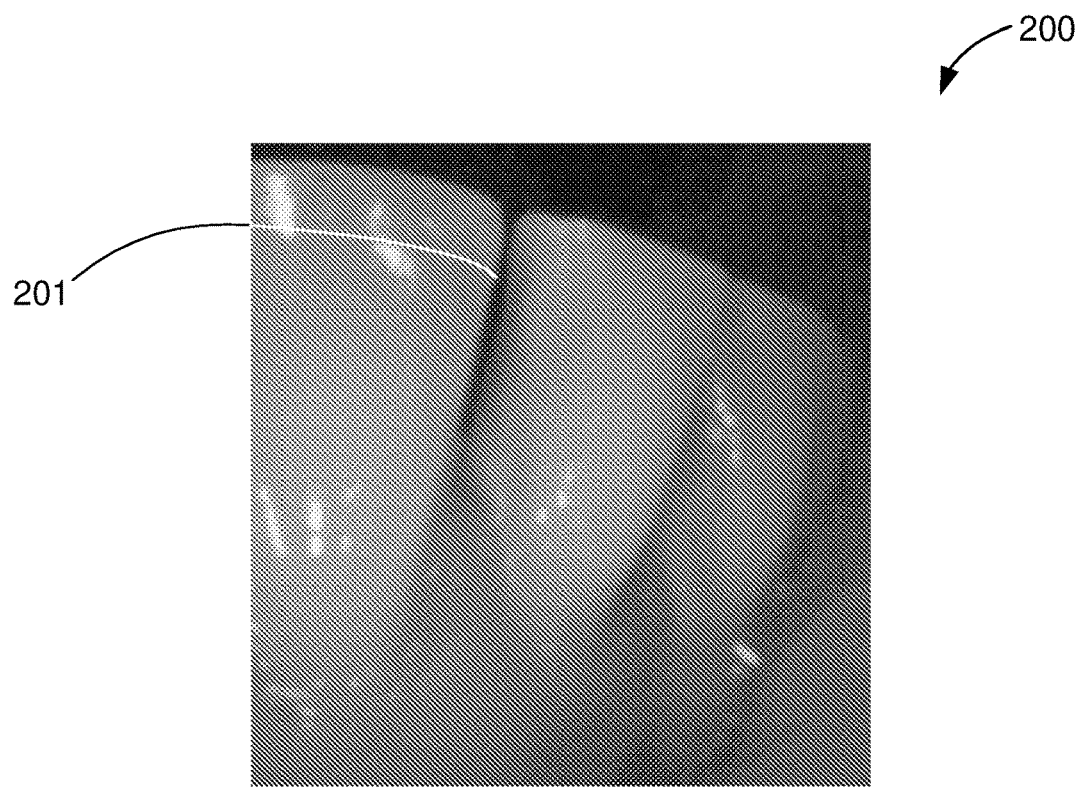
FIG. 2A shows an example view of a portion of a subject's dentition that includes an interproximal space.
Figure 2B:
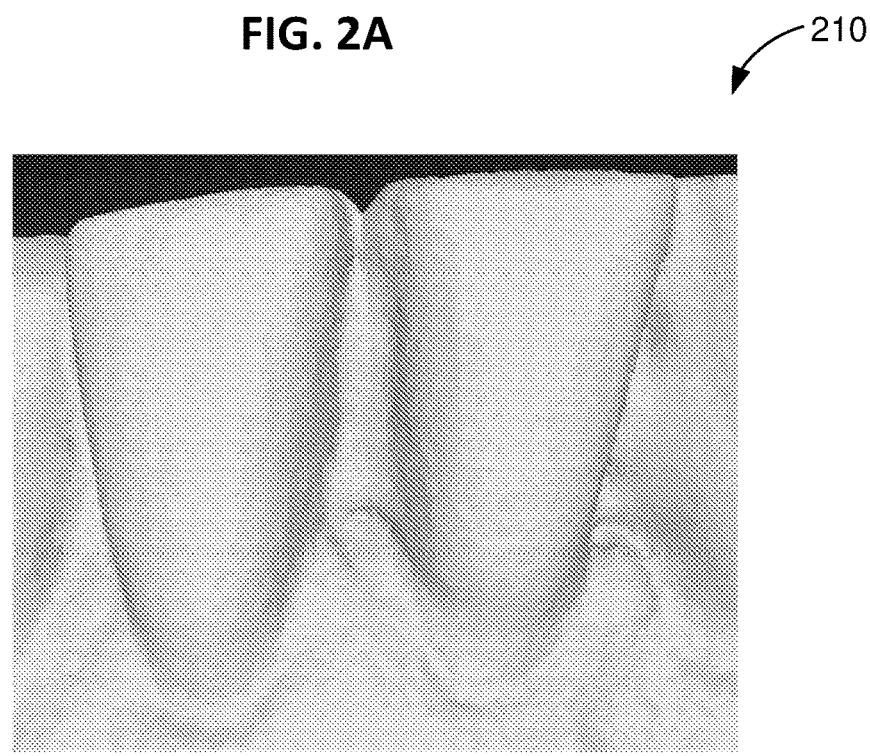
FIG. 2B shows an example 3D model where the feature corresponding to the interproximal space of FIG. 2A is missing.

FIG. 2A shows an example view of a portion of a subject's dentition 200 that includes an interproximal space 201. In this view, the interproximal space clearly shows that the teeth adjacent to the interproximal space 201 are separate. FIG. 2B shows an example of a digital 3D model 210 of the same region of the dentition, in which the interproximal space 201 of FIG. 2A is missing and appears as a continuous connection between the teeth. In FIG. 2B, the 3D model 210 shows that the adjacent teeth are connected, and not separate.

Figure 3:
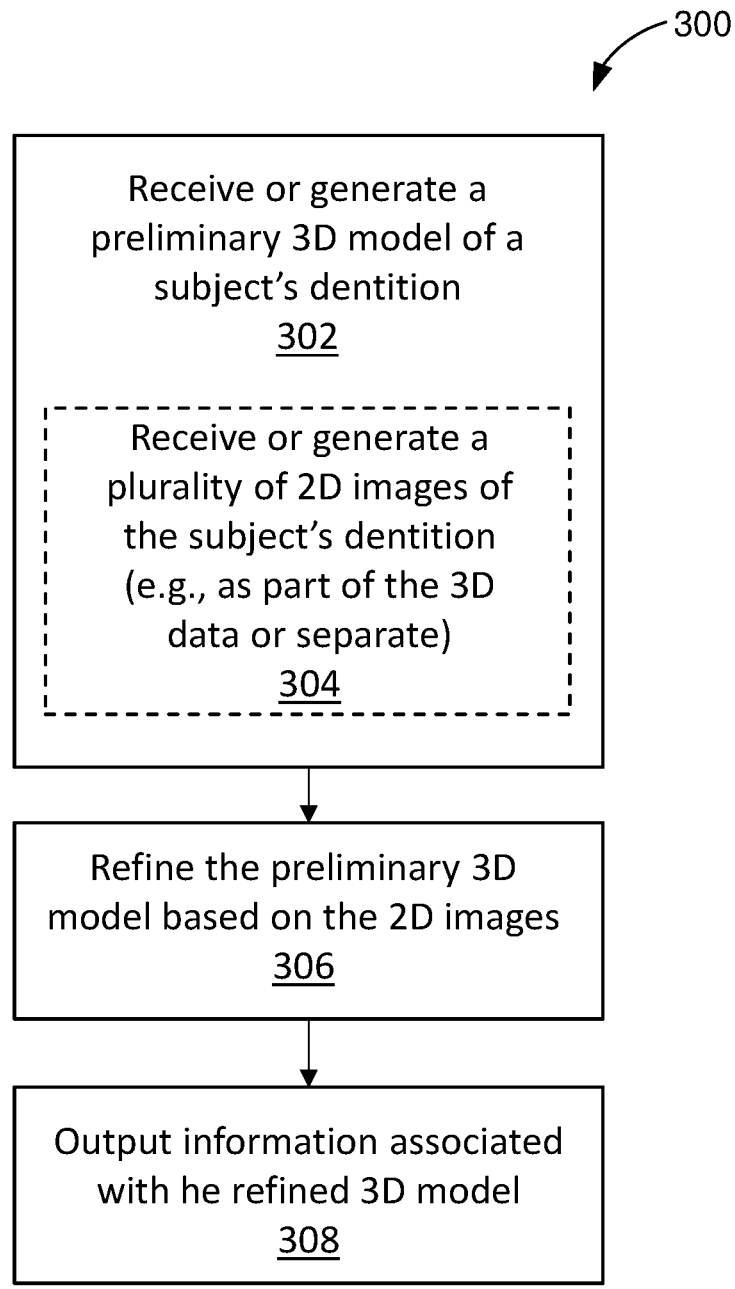
FIG. 3 is a flowchart showing an example method for modifying a 3D model of a subject's dentition.

FIG. 3 is an example of a method 300 for modifying a 3D model of a subject's dentition as described herein. Some examples may perform the operations described herein with additional operations, fewer operations, operations in a different order, operations in parallel, and some operations differently. The method 300 is described below with respect to the 3D model generation apparatus 100 of FIG. 1, however, the method 300 may be performed by any other suitable system, apparatus, or device.

A preliminary 3D model (also referred to as an initial 3D model) of a subject's dentition may be received or generated 302. The preliminary 3D model may be based on a scan of the subject's dentition. For example, the processing node 110 may receive a preliminary 3D model that may have been created by another device, apparatus, or method. In another example, the 3D model generation apparatus 100 may generate the preliminary 3D model. The preliminary 3D model may include interproximal spaces that are incorrectly represented, such as shown in FIG. 2B.

As shown in FIG. 3, 2D images of the subject's dentition may be included with the received or generated 3D model, or they may be separately received or generated. For example, the 2D images may be part of the 3D data, e.g., 2D images may be interlaced (e.g., four 3D frames may be interlaced with one 2D frame, or other combinations) with the 3D date. If the 2D images are included with the 3D data, the apparatus may know where the 2D images were taken from, including the camera position at the time of capture. This may be done by interpolating between the positions of the 3D capture on both sides (e.g., in time) of the 2D capture. Optionally IMU data from the intraoral scanner may be used. Thus, in general, the 3D model generation apparatus 100 may receive or generate a plurality of two-dimensional (2D) images of the subject's dentition 304. For example, the image capturing device 120 may capture images 2D images of the subject's dentition. In another example, the 3D model generation apparatus 100 may receive a plurality of 2D images of the subject's dentition from another device. In particular, in some examples the 2D images may be included with the 3D data. For example, the 2D images may be interlaced with the 3D data (e.g., 4 3D frames and 1 2D frame, or other combinations). Thus, the 3D model and 2D images may be received together (at the same time) and the 3D model may be generated by separating the 3D data from the same data stream as the 2D images; the 2D images may be generated by separating from the same data stream. The example may be particularly helpful as the same data including both the 2D images and the 3D data may include location and/or orientation information indicating where the images were taken, including the camera position at the time of capture. This may be done by interpolating between the positions of the 3D capture on both sides (in time) of the 2D capture, which may include IMU data.

The plurality of 2D images may be from buccal, lingual, and/or occlusal directions. The 2D images may be based on any appropriate imaging modality, e.g., white light (WL), near infrared light, structured light, florescence light, or any other feasible light (including stray light or other edge light effects).

In some examples, the 2D images may be captured by an intra-oral camera that may be moved throughout the patient's mouth. Some intra-oral cameras may include one or more inertial measurement units (IMUs) that may assist in providing location information of the camera while images are captured. In some examples, the 2D images may correspond to the preliminary 3D model and captured (taken) as part of the same scan used to determine the preliminary 3D model.

Next, in block 306, the 3D model generation apparatus 100 may refine the preliminary 3D model (received or generated in block 302) based on the plurality of 2D images (received or generated in block 304). In some examples, information from the 2D images may be used to determine rays that intersect with various regions of the preliminary 3D model. For example, the 2D images may be analyzed to identify the boundary of an interproximal region(s); different 2D images corresponding to different relative camera positions may be examined for each interproximal region identified. The interproximal region identified may be divided up into a plurality of points around the boundary and these points may be used to project rays that pass through the boundary of the interproximal region and both into and out of boundaries of the interproximal region in 3D space. Multiple rays passing through the boundary be used to initially add points to the point cloud, and information from additional rays may be used to determine what added points may then be removed. In this manner, information associated with the ray intersection may be used to refine the preliminary 3D model to include more accurate interproximal space information. This process is described in more detail below in conjunction with FIGS. 4-7B.

Returning to FIG. 3, the method may include an output 308, for example, the 3D model generation apparatus 100 may output information associated with the refined 3D model. For example, the refined 3D model may be rendered and displayed on the display device 130 for a user to view. In another example, the refined 3D model may be output and stored within the data storage device 140 for later retrieval. As described above, the refined 3D model may include interproximal space information. In some examples, the output information may include a measurement of the interproximal space between teeth. In some examples, the refined 3D model may be output to a segmentation algorithm. The segmentation algorithm may separate the refined 3D model into individual teeth.

Figure 4:
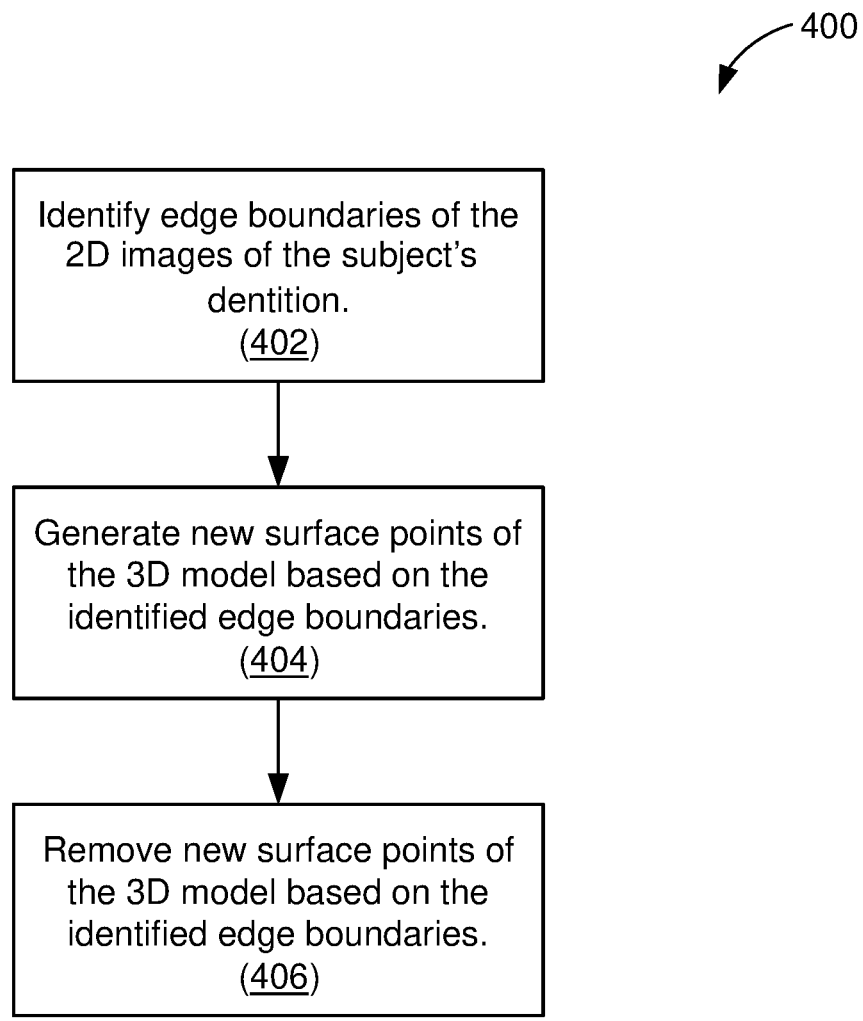
FIG. 4 is a flowchart showing an example method for refining a preliminary 3D model based on two-dimensional (2D) images as referred to in FIG. 3.

FIG. 4 illustrates an example of a method 400 for refining a preliminary 3D model based on 2D images as referred to at least in block 306 of FIG. 3. In FIG. 4, method 400 may include analyzing the 3D model by identifies edge boundaries of the 2D images of the subject's dentition 402. The edge boundaries may be edges of one or more teeth around an interproximal region in one or preferably more of the 2D images associated with the 3D model. As mentioned, this step may be performed manually, automatically or semi-manually. In some examples, edges (or boundaries) of the interproximal region(s) may identified for the same interproximal region(s) from a plurality of different 2D images each having a different associated camera position (e.g., angle) relative to the patient's teeth. Furthermore, in some examples, the 3D model generation apparatus 100 may use a machine-learning (ML) trained model to assist in identifying edge boundaries. The boundary may be divided up into a finite number of points around its periphery through which rays extending from the putative camera positions may be visualized and used to generate additional points into the point cloud of the 3D model so that points may be added to the 3D model. In some examples, after the edge boundary is identified, the 3D model generation apparatus 100 may smooth the identified edge boundaries. For example, the 3D model generation apparatus 100 may use a method (algorithm) based on smoothed splines to smooth the identified edge boundaries.

In any general, the boundary detection can be done with any classical boundary detection method. In some examples a deep learning network can be used. For example, training of network can come from labeling, but also by automatic learning. This can come from the fact that large interproximal space (e.g., over 500 μm or 1 mm) can be detected and be used as a basis to automatic teaching of the system. For example, a convolutional neural network (such as but not limited to U-Net) may be used.

In some examples, identifying edge boundaries (sometime referred to as identifying edge information) may include determining surface and surface tangent information of the 3D model. For each ray from the putative camera to the boundary point(s) that passes through the 3D model, new points may be added to the original point cloud, e.g., at a constant separation along the ray and between the intersection points of the outside surface of the original 3D model. Each of these points is associated to a normal at the direction which is perpendicular to the ray, and tangent to the IP-space boundary after being projected to 3D at the point's position. Conflicting points added in this manner from different 2D images of the same interproximal region may then be removed, resulting in a new surface representing the putative tooth (or possibly gingival) surface bounding the interproximal region. For example, multiple 2D images of the same interproximal space may be processed as described herein and the rays extending from the putative camera position through the periphery may be used to add new points that may then be removed if they conflict.

Thus, the 3D model generation apparatus 100 may generate new surface points of the 3D model based on the identified edge boundaries 404. The point cloud may be a collection of points that are associated with one or more surfaces of a 3D model. The point cloud may define one or more surfaces of a 3D model of the patient's teeth.

The new surface points may be found along rays that may be associated with the identified edge boundaries from block 402. Determination of the new surface points is described in more detail below in conjunction with FIGS. 5-7.

As mentioned, at least some of the new surface points may be removed from the preliminary 3D model 406. The new surface points may be determined to be associated with interproximal spaces. Thus, removing surface points from the preliminary 3D model may remove points from the point cloud associated with interproximal spaces. By removing the new surface points, interproximal spaces may be included within the preliminary 3D model. In this manner, the preliminary 3D model may be modified or updated to a refined 3D model.

Figure 5:
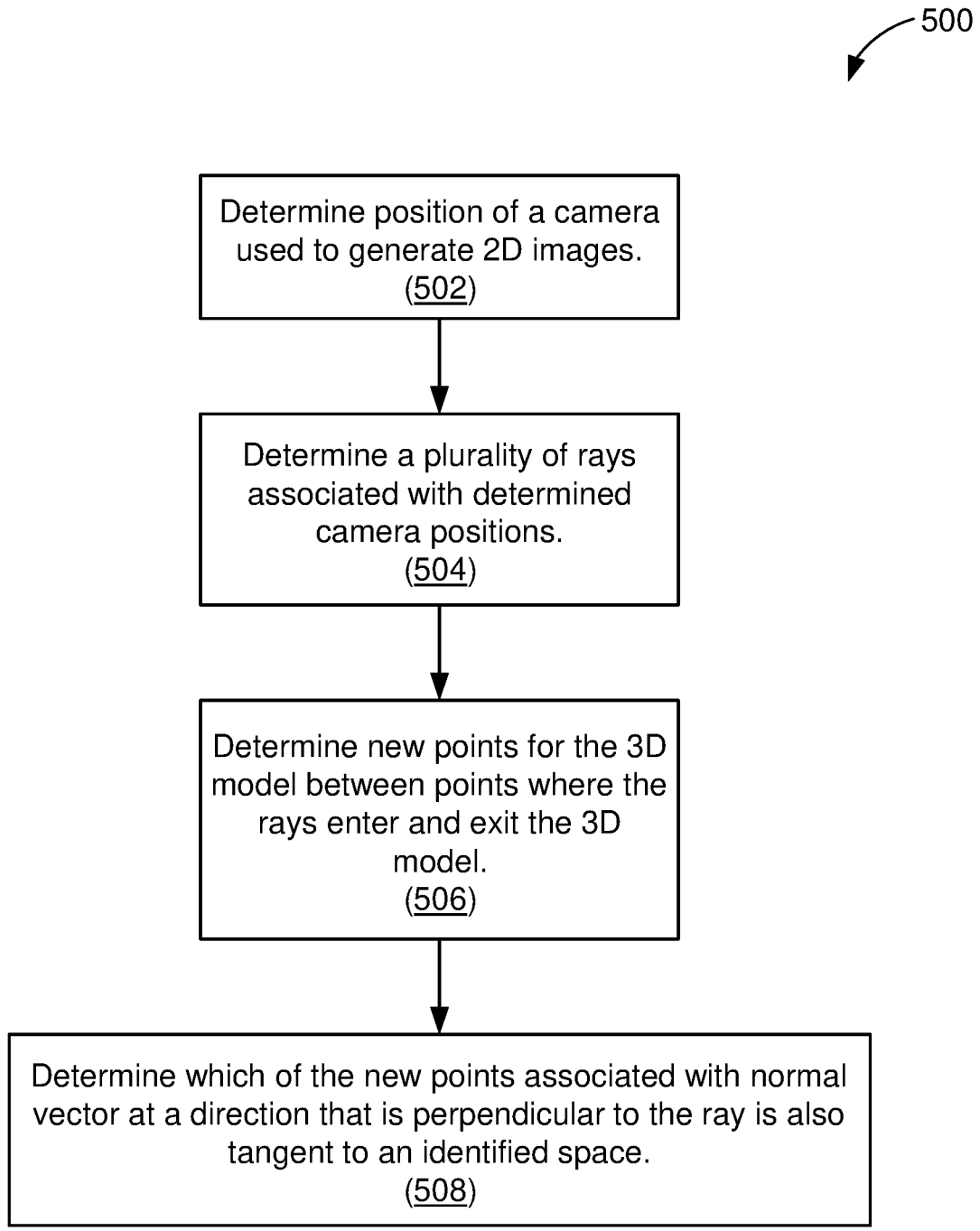
FIG. 5 is a flowchart showing an example method for generating new surface points of a 3D model based on identified edge boundaries as referred to in FIG. 4.

For example, FIG. 5 illustrates a method 500 for generating new surface points of a 3D model based on identified edge boundaries as referred to at least in block 404 of FIG. 4. The 3D model generation apparatus 100 may determine a position of a camera used to generate one of more of the 2D images 502. The 2D images may include the 2D images of the subject's dentition received or generated with respect to block 304 of FIG. 3. Determination of the camera position may be through the 3D data and/or from one or more IMUs included within the camera used to generate the one or more 2D images. In some examples, camera position information may be stored with the 2D images within the data storage device 140 of FIG. 1. Alternatively, the camera position may be determined relative to the earth, rather than (or in addition to) relative to the patient. For example, camera position may be determined by interpolation during 3D scanning (e.g., by structured light capture, confocal, etc.). In some examples, imaging may be alternated between capture of structured light images and capture of other images (e.g., white light, florescent, etc.). The camera position may therefore be determined by stitching of structured light; the camera position may be determined from the stitching using structured light, and the camera position during acquisition of the other imaging (e.g., white light, florescent, etc.) may be estimated during this intervening intervals (e.g., within 10 ms intervals in some examples). In some cases the use of an IMU may improve or augment this interpolative technique.

The 3D model generation apparatus 100 may determine a plurality of rays associated with the determined camera positions 504. A ray refers to a path of light that may be traced or referenced back to a camera that has captured or is otherwise associated with the 2D images. Thus, for every possible camera position and image, there may be one or more associated rays.

The 3D model generation apparatus 100 may determine new points for the 3D model between points where the rays enter and exit the 3D model 506. Each ray determined in block 504 may be projected. The projected ray may intersect the 3D model (e.g., between the outer surfaces of the 3D model). For example, the projected ray may enter and exit the 3D model. To determine the new points, the 3D model generation apparatus 100 may project, associate, and/or attach a plurality of points to each ray. In some examples, each new point may be evenly spaced from other new points.

The 3D model generation apparatus 100 may then determine which of the new points associated with a normal vector at a direction that is perpendicular to the ray is also tangent to an identified space 508. Any point that is tangent to an identified space (e.g., tangent to a surface of a tooth as determined by an identified interproximal space), may be associated with an interproximal space. In some examples, the point that is tangent to the identified space may be an initial point of the point cloud that is associated with an interproximal space. Thus, points along the ray, beginning with the point tangent to an identified space, should be removed from the point cloud associated with the 3D model. These points may be removed as described above with respect to block 406 of FIG. 4. The methods of FIGS. 3-5 are illustrated below in the examples shown in FIGS. 6A-6B and 7A-7B.

Figure 6A:
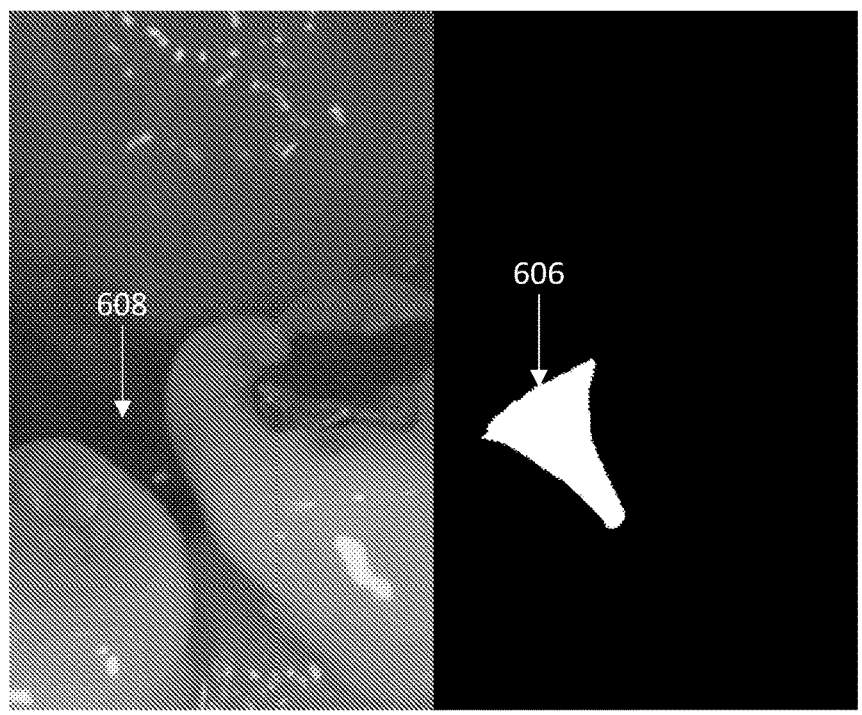
FIG. 6A shows one example of the identification of interproximal spaces from a 2D image of a patient's dentition.
Figure 6B:
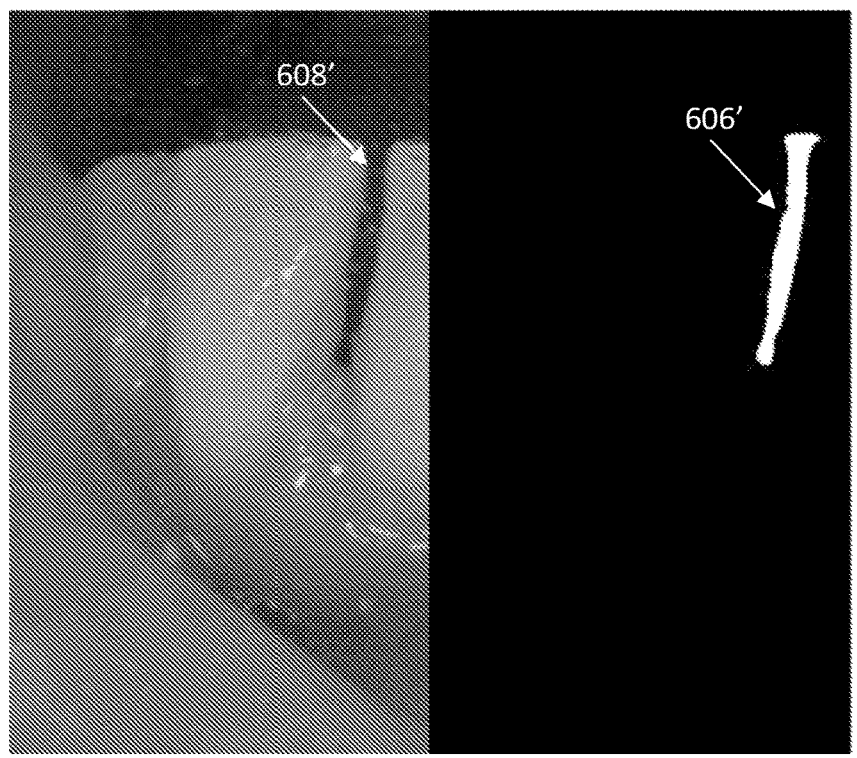
FIG. 6B shows an example of the identification of interproximal spaces from a 2D image of a patient's dentition.

FIGS. 6A and 6B illustrate the identification (e.g., by a trained machine learning agent) of the interproximal region 608 between two teeth. This region may be extracted from the 2D image, and the boundary of the interproximal region 606 determined, as shown in FIG. 6A (right side). FIG. 6B shows another example of a tooth region including an interproximal space 608' that may be automatically or semi-automatically identified, e.g., by a machine learning agent, so that the boundaries of the interproximal region 606' may be determined. As mentioned, this bounded region may be enclosed, and the surface may be smoothed, expanded, or otherwise processed including as described herein.

In some examples, after the IP region has been identified (and marked) on the 2D image, and the boundary of this region identified, smoothing (e.g., smoothed splines) may be applied to get a smooth representation of the boundary. For each 2D image associated with the 3D model from which an interproximal region has been identified, the camera position corresponding to the position of the camera during the capture of the image relative to the 3D data may be known or determined. In some examples, the 3D capture and the WL images may be taken in an interlacing cycle. For example, an intraoral scanner may alternate between taking one color image and one 3D capture; in some examples a few 3D captures (e.g., structure light data captures) and one color image (e.g., white light 2D images) may be alternately collected by the intraoral scanner and included together with the 3D data that the method or apparatus may use to determine camera position for each 2D image.

For example, this camera location can be determined for each 2D image by interpolating the positions of the 3D captures, and/or by interpolating the location and adding IMU information to refine it. In any of these examples, filtering rough acceleration may change as cases which camera position is not accurate enough. Other methods of determining or refining the camera location may use the images themselves for registration, in a multi camera view case.

Figure 7A:
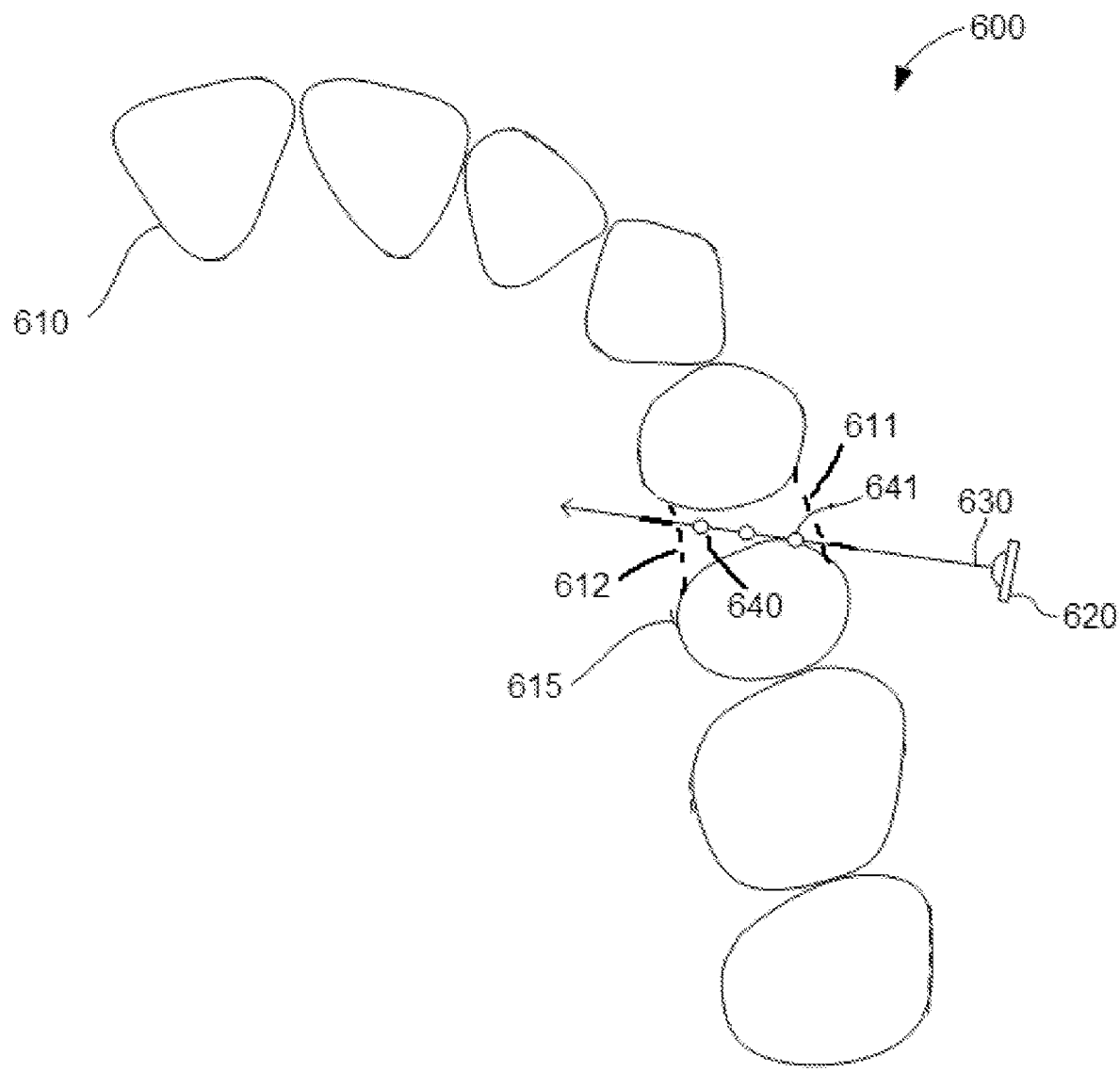
FIG. 7A shows an example of a planar view of a subject's 3D model.

In any of these methods, a certain number of points along the boundary may be selected and each used to define a ray in 3D. This may be given by the camera model. This is illustrated for two different images (taken at two different camera positions). For example, FIG. 7A shows an example of a planar view of a 3D model of a subject's dentition 600. The example subject's 3D model 600 may be a complete or a partial model, e.g., showing a portion of a patient's dental arch (e.g., upper arch). Although shown in terms of the upper dental arch, the procedures and methods described here may be applied to any portion of a subject's dental arch, using the full or partial 3D model. The 3D model 600 may include a plurality of teeth 610. The 3D model 600 may also include an outer boundary 611 and an inner boundary 612.

In the example shown in FIG. 7A, a camera 620 is shown in a position that is associated with a previously captured 2D image. A ray 630 is shown leaving the camera 620 and intersecting with the 3D model 600. In FIG. 7A, only one ray 630 is shown for simplicity. Any number of rays may leave the camera 620 at any position. Rays may be directed to the points identified on the boundary of the interproximal region(s), as mentioned above. The ray 630 enters and intersects the 3D model 600 through the outer boundary 611 (e.g., a buccal side) and exits through the inner boundary 612 (e.g., a lingual side). A plurality of points 640 are shown on the ray 630. The points 640 may be spaced evenly (regularly) and are within the 3D model 600. Each of the points may be associated with a normal vector that is perpendicular to the ray 630.

A system, such as the 3D model generation apparatus 100, may determine which of the points 640 may be tangent to a tooth. As shown, point 641 is tangent to a surface of tooth 615. As will be described in greater detail below, since at least one of the points 640 is tangent to a surface of a tooth, the points 640 associated with the ray 630 may be removed the point cloud that make up the 3D model 600. Removing these points help insert and define an interproximal space between two teeth of the 3D model 600.

Figure 7B:
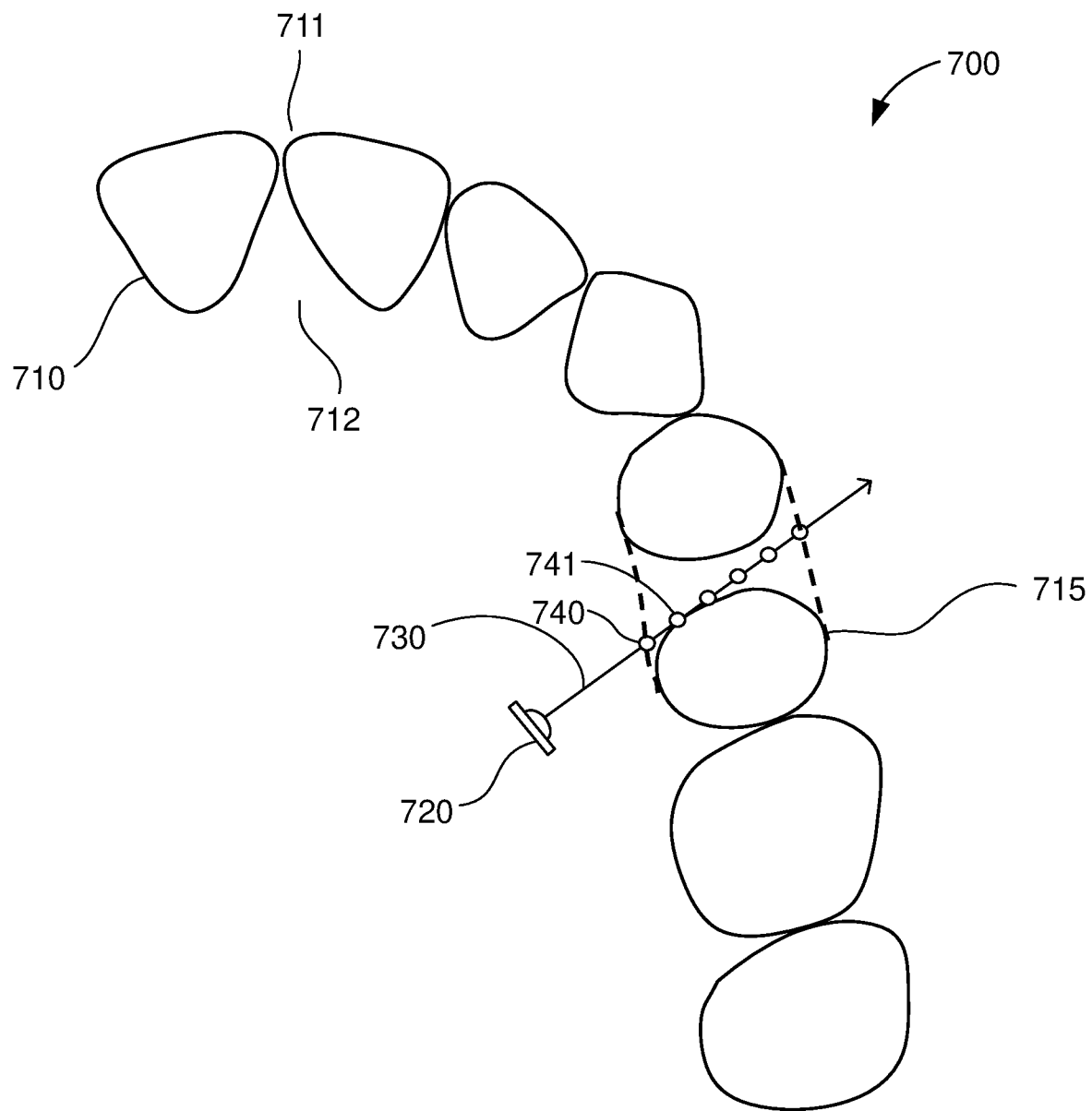
FIG. 7B shows another example of a planar view of a subject's 3D model.

FIG. 7B shows another example of a planar view of the same subject's 3D model 700 as in FIG. 7A, showing a second camera position. As mentioned above, in this example the subject's 3D model 700 may be a partial model showing a portion of a patient's upper dental arch for simplicity. Although shown in terms of the upper dental arch, the procedures and methods described here may be applied to any portion of a subject's 3D model. The 3D model 700 may include a plurality of teeth 710. The 3D model 700 may also include an outer boundary 711 and an inner boundary 712.

The camera 720 is shown in a position that is associated with a previously captured 2D image. A ray 730 is shown leaving the camera 720 and intersecting with the 3D model 700. (Only one ray 730 is shown for clarity. Any number of rays may leave the camera 720 at any position.) The ray 730 enters and intersects the 3D model 700 through the inner boundary 712 (e.g., a lingual side) and exits through the outer boundary 711 (e.g., a buccal side). A plurality of points 740 are shown on the ray 730. The points 740 may be spaced evenly (regularly) and are within the 3D model 600. Each of the points may be associated with a normal vector that is perpendicular to the ray 730.

A system, such as the 3D model generation apparatus 100, may determine which of the points 740 may be tangent to a tooth. As shown, point 741 is tangent to a surface of tooth 715. Since at least one of the points 740 is determined to be tangent to a surface of a tooth, the points 740 associated with the ray 730 may be removed the point cloud that make up the 3D model 700. Removing these points help insert and define an interproximal space between two teeth in the 3D model 700.

In any of these methods and apparatuses, points may be removed by determining where the rays (or points/regions of the rays) intersect each of the rays found earlier with a 3D Poisson reconstructed model. Since the model is (generally speaking) watertight, and the ray's starting positions are outside of the model, each ray would either not intersect with the 3D model at all or may intersect with the 3d model at least twice—the first intersection would be with a front face (when entering the model) and the second intersection with a back face (when exiting the model). New points with normals along rays between the intersection points may be added, as mentioned above. For example, for each ray, new points may be to the original point cloud (e.g., original 3D model), at a constant separation along the ray(s) and between the intersection points (between the outside surfaces of the model). Each of these points may be associated to a normal at the direction which is perpendicular to the ray, and tangent to the IP-space boundary after being projected to 3D at the point's position. Conflicting points may then be removed. For example, the steps above (generating the rays and adding new points) may be repeated for any number of 2D images that include a view of the interproximal region identified. This process adds points to the original point cloud (3D model). The 3D model may then be checked to determine if the added points fall within the Interproximal-space region of all the other 2D images. If so, the new point may be removed from the point cloud (e.g., from the 3D model).

Figure 8:
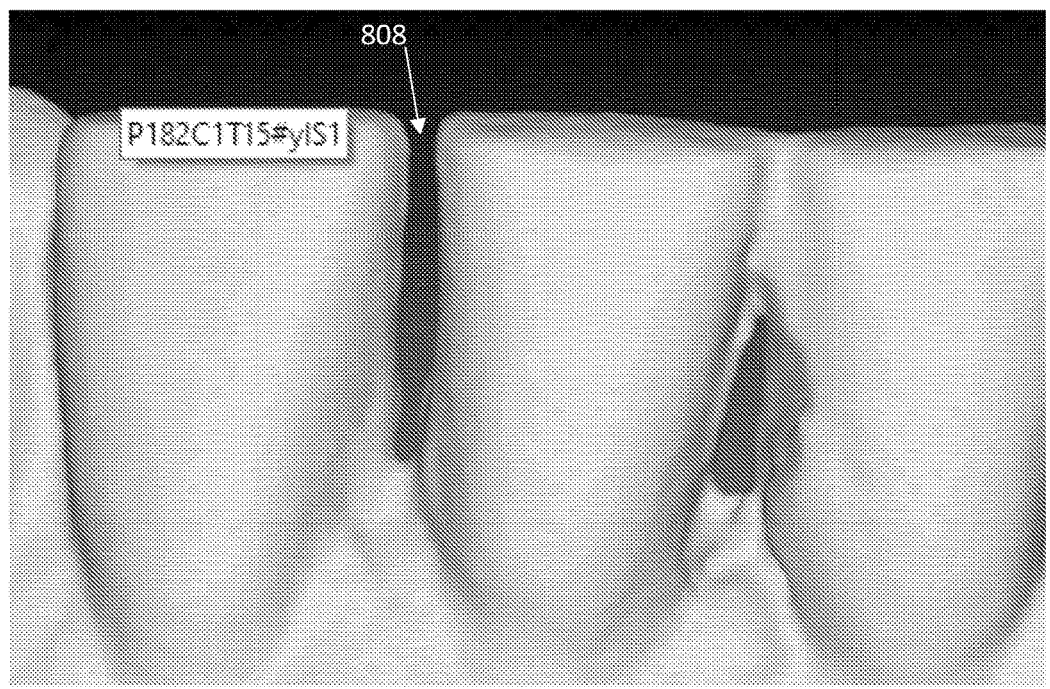
FIG. 8 shows an example refined 3D model that may be the result of the operations described in FIGS. 3-7.

FIG. 8 shows an example refined 3D model that may be the result of the operations described in FIGS. 3-7. As shown, the resulting 3D model includes the interproximal space 808 as described above.

Figure 9:
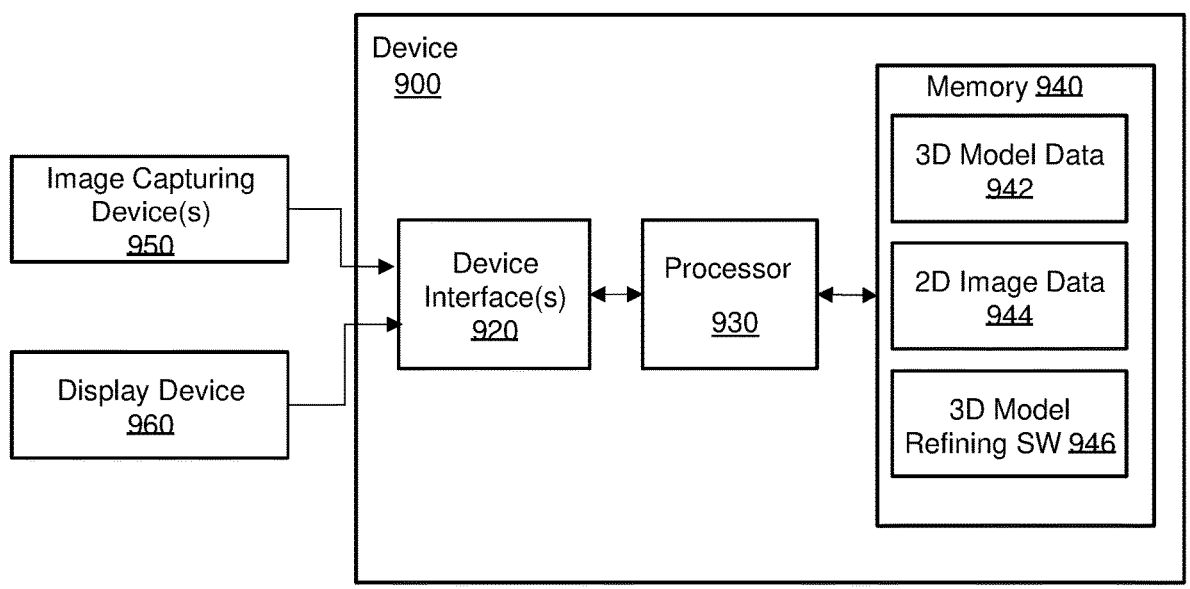
FIG. 9 shows a block diagram of a device that may be one example of the 3D model generation device of FIG. 1.

FIG. 9 shows a block diagram of a device 800 that may be one example of the 3D model generation device 100 of FIG. 1. Although described herein as a device, the functionality of the device 900 may be performed by any feasible apparatus, system, or method. The device 900 may include a device interface 920, a processor 930, and a memory 940.

The device interface 920, which is coupled to the processor 930, may be used to interface with any feasible input and/or output device. For example, the device interface 920 may be coupled to and interface with one or more image capturing devices 950. Example image capturing devices may include 2D image capturing devices that are sensitive to white light, near infrared light, fluorescence light, or any other feasible light. Some image capturing devices 950 may include 3D image capturing devices. In another example, the device interface 920 may be coupled to and interface with a display device 960. Through the display device 960, the processor 930 may display 2D images, 3D models, refined 3D models, or the like.

The coupling between the image capturing device 950 and the device interface 920 and between the display device 960 and the device interface may be a wired or wireless interface. Example wireless interfaces include Bluetooth, Wi-Fi, cellular Long Term Evolution (LTE), or the like.

The processor 930, which is also coupled to the memory 940, may be any one or more suitable processors capable of executing scripts or instructions of one or more software programs stored in the device 900 (such as within memory 940).

The memory 940 may include 3D model data 942 that may have been generated or received by the device 900. For example, preliminary 3D model data may be received through a data interface (not shown) from another device. In another example, the 3D model data 942 may also include refined 3D model data. The processor 930 may display any feasible 3D model data on the display device 960.

The memory 940 may include 2D image data 944. For example, the 2D image data 944 may be captured from any feasible 2D image capturing device (e.g., camera) included within the image capturing devices 950. In another example, the 2D image data may be received through a data interface (not shown). The 2D image data 944 may include camera location information associated with the 2D images.

The memory 940 may also include a non-transitory computer-readable storage medium (e.g., one or more nonvolatile memory elements, such as EPROM, EEPROM, Flash memory, a hard drive, etc.) that may store a 3D model refining software module 946. The 3D model refining software module 946 includes program instructions that, when executed by the processor 930, may cause the device 900 to perform the corresponding function(s). Thus, the non-transitory computer-readable storage medium of memory 940 may include instructions for performing all or a portion of the operations described herein.

The processor 930 may execute the 3D model refining software module 946 to determine the temperature of one or more body locations of a patient. For example, execution of the 3D model refining software module 946 may refine an existing (preliminary) 3D model of a subject's dentition, in some cases by adding or refining interproximal space information. In some cases, 2D image information is used to determine an interproximal space. Trained neural networks may be used to locate an interproximal space using 2D image information. In another example, execution of the 3D model refining software module 946 may determine one or more rays associated with a camera. The rays may intersect a 3D model and be tangent to a tooth of the 3D model. Execution of the 3D model refining software module 946 remove portions of the 3D model that may be associated with the rays intersecting the 3D model and tangent to a surface of a tooth. Thus, the processor 930 may execute the 3D model refining software module 946 to perform operations associated with FIGS. 3-5.

As mentioned above, these methods are not limited to strictly the space between teeth; interproximal spacing may also refer to convex structures (e.g., tooth surfaces) that cannot be readily captured in 3D intraoral scanning. For example, the back wall of the last molar may sometimes be lacking in captured 3D models. The methods and apparatuses described herein can be useful for determining the tooth shape of this region, and the wall can be seen in the 2D image, such as a white-light image, but may not be seen by the 3D capture.

In addition to refining the 3D model as described herein, these methods may also be configured to output data regarding the refined interproximal region. For example, numerical values of the interproximal distances can be computed and added as auxiliary information for any of the 3D models processed as described herein. For example, the method described above may be used to refine the interproximal region in the 3D model, and the refined model may be segmented at the added points between the two adjacent teeth; the minimal distance between these teeth may then be determined.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits described herein.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like. For example, any of the methods described herein may be performed, at least in part, by an apparatus including one or more processors having a memory storing a non-transitory computer-readable storage medium storing a set of instructions for the processes(s) of the method.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
one or more processors; and
a memory configured to store instructions that, when executed by the one or more processors, cause the one or more processors to perform the method comprising:
receiving or generating a three-dimensional (3D) model of a subject's dentition, wherein the 3D model is based on a scan of the subject's dentition;
generating a refined 3D model from the 3D model of the subject's dentition by:
determining one or more edge boundaries of a space around or between one or more teeth of the 3D model identified from a plurality of two-dimensional (2D) images of the subject's dentition, wherein the plurality of 2D images of the subject's dentition correspond to the 3D model,
generating potential new surface points for the 3D model from the identified one or more edge boundaries of the plurality of 2D images, and
removing at least a subset of the potential new surface points that fall within the one or more edge boundaries of the space around or between the one or more teeth for each of the plurality of 2D images; and
outputting the refined 3D model and/or information associated with the refined 3D model.

2. The system of claim 1, wherein the 3D model or data for the 3D model and the plurality of 2D images are received as part of the same data stream.

3. The system of claim 1, wherein identifying the one or more edge boundaries of the space around or between the one or more teeth comprises identifying, for each of at least a subset of the plurality of the 2D images, a boundary of the space around or between the one or more teeth from each of the plurality of 2D images of the subject's dentition in the subset using a trained neural network.

4. The system of claim 3, further wherein the method performed by the one or more processors further comprises comprising smoothing an edge of each identified boundary.

5. The system of claim 1, wherein generating the potential new surface points for the 3D model from the identified one or more edge boundaries comprises using a position of a camera corresponding to each of the plurality of 2D images of the plurality of 2D images.

6. The system of claim 5, wherein the method performed by the one or more processors further comprises:
mapping the one or more identified edge boundaries of the plurality of 2D images to the 3D model and determining rays formed between a plurality of points on each of the edge boundaries and the position of the camera during capture of the plurality of 2D images of the subject's dentition relative to a surface of the subject's dentition; and
generating the potential new surface points for the 3D model between points on a surface of the 3D model where each ray enters and exits the surface of the 3D model.

7. The system of claim 6, wherein each point has an associated normal vector at a direction that is perpendicular to a corresponding ray and to a tangent to the space.

8. The system of claim 1, wherein the space comprises an interproximal space between two teeth of the subject's dentition.

9. The system of claim 8, wherein the information outputted comprises an indication of whether the two teeth are touching.

10. The system of claim 8, wherein the information outputted comprises a measurement of the space between the two teeth.

11. The system of claim 1, wherein outputting the information comprises displaying the information to a user.

12. The system of claim 1, wherein the outputting the information comprises outputting to a segmentation algorithm, and wherein the segmentation algorithm separates the refined 3D model into individual teeth.

13. The system of claim 1, wherein the plurality of 2D images are white light images.

14. The system of claim 1, wherein the plurality of 2D images are near infrared images.

15. The system of claim 1, wherein the plurality of 2D images are fluorescence images.

16. A system comprising:
one or more processors; and
a memory configured to store instructions that, when executed by the one or more processors, cause the one or more processors to perform the method comprising:
receiving or generating a three-dimensional (3D) model of a subject's dentition, wherein the 3D model is based on a scan of the subject's dentition;
receiving or generating a plurality of two-dimensional (2D) images of the subject's dentition corresponding to the 3D model taken as part of the same scan of the subject's dentition;
generating a refined 3D model from the 3D model of the subject's dentition by:
determining edge boundaries of a space around or between one or more teeth of the 3D model identified from the plurality of 2D images of the subject's dentition,
generating new surface points for the refined 3D model from the identified edge boundaries of the plurality of 2D images, and
removing at least a subset of the new surface points that fall within the one or more edge boundaries of the space around or between the one or more teeth for each of the plurality of 2D images; and
segmenting the refined 3D model to separate individual teeth of the refined 3D model.

17. A system comprising:
an intraoral scanner;
one or more processors; and
a memory configured to store instructions that, when executed by the one or more processors, cause the one or more processors to perform the method comprising:
capturing three-dimensional (3D) information of a surface of a subject's dentition using the intraoral scanner;
generating a 3D model of the surface of the subject's dentition from the 3D information;
capturing a two-dimensional (2D) image of the surface of the subject's dentition using the intraoral scanner;
determining edge boundaries of a space around or between one or more teeth of the 3D model identified from the captured 2D image;
determining rays between a plurality of points on the edge boundaries of the 3D model and a position of a camera during capture of the 2D image of the subject's dentition relative to the surface of the subject's dentition;
refining the generated 3D model, to generate a refined 3D model, by removing at least a subset of the plurality of points that intersect the 3D model and that are tangent to a surface of the one or more teeth of the 3D model; and
outputting the refined 3D model and/or information associated with the refined 3D model.

18. A system comprising:
an intraoral scanner comprising one or more cameras;
one or more processors; and
a memory configured to store instructions that, when executed by the one or more processors, cause the one or more processors to perform the method comprising:
capturing three-dimensional (3D) information of a surface of a subject's dentition using the intraoral scanner by projecting a structured light pattern on the surface and capturing the projected structured light pattern with the one or more cameras;
generating a 3D model of the surface of the subject's dentition from the 3D information using a correspondence algorithm or triangulation algorithm;
determining edge boundaries of a space around or between one or more teeth of the 3D model identified from captured two-dimensional (2D) images from the one or more cameras from percolation of the structured light pattern;
determining rays between a plurality of points on the edge boundaries of the 3D model and a position of a camera during capture of the 2D images of the subject's dentition relative to the surface of the subject's dentition;
refining the generated 3D model, to generate a refined 3D model, by removing at least a subset of the plurality of points that intersect the 3D model and that are tangent to a surface of the one or more teeth of the 3D model; and outputting the refined 3D model and/or information associated with the refined 3D model.

* * * * *